United States Patent
Cross et al.

(10) Patent No.: US 12,167,440 B2
(45) Date of Patent: *Dec. 10, 2024

(54) SYSTEMS AND METHODS FOR TRAFFIC PRIORITY SYSTEMS

(71) Applicant: STC, Inc., McLeansboro, IL (US)

(72) Inventors: Brad Cross, McLeansboro, IL (US); Terry Fryar, Renton, IL (US); Nicholas Freed, Thompsonville, IL (US)

(73) Assignee: STC, Inc., McLeansboro, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/233,151

(22) Filed: Aug. 11, 2023

(65) Prior Publication Data
US 2023/0389065 A1    Nov. 30, 2023

Related U.S. Application Data

(63) Continuation of application No. 17/533,600, filed on Nov. 23, 2021, now Pat. No. 11,758,579, which is a
(Continued)

(51) Int. Cl.
*H04W 72/56* (2023.01)
*G08G 1/087* (2006.01)
(Continued)

(52) U.S. Cl.
CPC ............ *H04W 72/56* (2023.01); *G08G 1/087* (2013.01); *G08G 1/096716* (2013.01);
(Continued)

(58) Field of Classification Search
CPC ... H04W 72/10; H04L 47/2433; G08G 1/087; G08G 1/096716; G08G 1/096725; G08G 1/09675; G08G 1/096791
See application file for complete search history.

(56) References Cited

U.S. PATENT DOCUMENTS

| 4,321,589 A | 3/1982 | King |
| 4,914,434 A | 4/1990 | Morgan et al. |

(Continued)

FOREIGN PATENT DOCUMENTS

| DE | 19712253 A1 | 10/1998 |
| DE | 19748173 A1 | 5/1999 |

(Continued)

OTHER PUBLICATIONS

Applied Information Inc., "Digital Media Kit," 2018, [retrieved on Jun. 22, 2018]. Retrieved from the Internet: <URL:http://appinfoinc.com/newsroom/digital-media-kit/>, 7 pages.
(Continued)

*Primary Examiner* — Ajay Cattungal
(74) *Attorney, Agent, or Firm* — Lewis Rice LLC

(57) ABSTRACT

Use of a mobile user device to identify the individual operating a vehicle, which, either alone or in conjunction with a vehicle control unit (VCU), may be used to establish vehicle priority in connection with traffic control systems. This provides for a system that provides priority for the individual based on their individual and current need for priority, as opposed to providing priority generally for a vehicle.

20 Claims, 4 Drawing Sheets

Related U.S. Application Data continuation of application No. 16/597,538, filed on Oct. 9, 2019, now Pat. No. 11,202,302.

(60) Provisional application No. 62/743,281, filed on Oct. 9, 2018.

(51) Int. Cl.
   *G08G 1/0967* (2006.01)
   *H04L 47/2425* (2022.01)

(52) U.S. Cl.
   CPC ... *G08G 1/096725* (2013.01); *G08G 1/09675* (2013.01); *G08G 1/096791* (2013.01); *H04L 47/2433* (2013.01)

(56) References Cited

U.S. PATENT DOCUMENTS

| | | | |
|---|---|---|---|
| 5,539,398 | A | 7/1996 | Hall et al. |
| 5,610,599 | A | 3/1997 | Nomura et al. |
| 5,926,113 | A | 7/1999 | Jones et al. |
| 5,929,787 | A | 7/1999 | Mee et al. |
| 5,986,575 | A | 11/1999 | Jones et al. |
| 6,064,319 | A | 5/2000 | Matta |
| 6,243,026 | B1 | 6/2001 | Jones et al. |
| 6,323,307 | B1 | 11/2001 | Bigg et al. |
| 6,621,420 | B1* | 9/2003 | Poursartip ............... G08G 1/087 340/906 |
| 7,098,806 | B2 | 8/2006 | Bachelder |
| 7,116,245 | B1 | 10/2006 | Bachelder |
| 7,327,280 | B2 | 2/2008 | Bachelder et al. |
| 7,663,505 | B2 | 2/2010 | Publicover |
| 7,751,390 | B2 | 7/2010 | Mosko et al. |
| 7,835,351 | B2 | 11/2010 | Mosko et al. |
| 7,864,071 | B2 | 1/2011 | Bachelder et al. |
| 7,868,783 | B2 | 1/2011 | Bachelder |
| 8,054,202 | B1 | 11/2011 | Sikora et al. |
| 8,274,404 | B2 | 9/2012 | Sennett et al. |
| 8,825,350 | B1 | 9/2014 | Robinson |
| 8,830,085 | B2 | 9/2014 | Edwardson et al. |
| 8,878,695 | B2 | 11/2014 | Cross |
| 8,972,159 | B2 | 3/2015 | Ferreira et al. |
| 9,349,288 | B2 | 5/2016 | Raamot |
| 9,558,666 | B2 | 1/2017 | Jansson et al. |
| 9,916,759 | B2 | 3/2018 | Cross |
| 9,934,685 | B1* | 4/2018 | Bernhardt ............... G08G 1/005 |
| 9,953,522 | B2 | 4/2018 | Cross et al. |
| 10,059,255 | B1* | 8/2018 | Schreiber ............... G08G 1/005 |
| 11,202,302 | B2* | 12/2021 | Cross ............... G08G 1/087 |
| 2001/0037174 | A1 | 11/2001 | Dickerson |
| 2002/0065599 | A1 | 5/2002 | Hameleers et al. |
| 2002/0126022 | A1 | 9/2002 | Ellis |
| 2006/0261977 | A1 | 11/2006 | Bachelder |
| 2007/0069920 | A1 | 3/2007 | Hakki et al. |
| 2009/0256721 | A1 | 10/2009 | Glatfelter |
| 2010/0141479 | A1 | 6/2010 | Arnold et al. |
| 2010/0309023 | A1 | 12/2010 | Busch |
| 2010/0325720 | A1 | 12/2010 | Etchegoyen |
| 2011/0109478 | A1 | 5/2011 | Williamson et al. |
| 2011/0187559 | A1 | 8/2011 | Applebaum |
| 2011/0205086 | A1 | 8/2011 | Lamprecht et al. |
| 2012/0188099 | A1 | 7/2012 | Lee et al. |
| 2012/0229303 | A1 | 9/2012 | Loffl et al. |
| 2012/0326890 | A1 | 12/2012 | Cross |
| 2012/0326891 | A1* | 12/2012 | Cross ............... G08G 1/087 340/906 |
| 2013/0018572 | A1 | 1/2013 | Jang |
| 2013/0048795 | A1 | 2/2013 | Cross |
| 2013/0083722 | A1 | 4/2013 | Bhargava et al. |
| 2013/0210460 | A1 | 8/2013 | Subramanian et al. |
| 2014/0185880 | A1 | 7/2014 | Fairfield et al. |
| 2014/0278029 | A1* | 9/2014 | Tonguz ............... G08G 1/161 701/117 |
| 2014/0278052 | A1 | 9/2014 | Slavin et al. |
| 2014/0291454 | A1 | 10/2014 | Cross |
| 2015/0213713 | A1* | 7/2015 | Taylor ............... G08G 1/0125 340/906 |
| 2015/0243165 | A1* | 8/2015 | Elsheemy ............... G08G 1/096775 340/906 |
| 2016/0163193 | A1 | 6/2016 | Cross |
| 2016/0189552 | A1 | 6/2016 | Hilleary |
| 2016/0267787 | A1 | 9/2016 | Whitney et al. |
| 2016/0292996 | A1 | 10/2016 | Kim et al. |
| 2016/0379490 | A1 | 12/2016 | Simanowski et al. |
| 2017/0092126 | A1* | 3/2017 | Oshida ............... G08G 1/005 |
| 2017/0116849 | A1 | 4/2017 | Foreman et al. |
| 2017/0132915 | A1 | 5/2017 | Cross et al. |
| 2017/0148317 | A1 | 5/2017 | Diba |
| 2017/0337819 | A1 | 11/2017 | Wei et al. |
| 2018/0096595 | A1 | 4/2018 | Janzen et al. |
| 2018/0204451 | A1 | 7/2018 | Cross et al. |
| 2018/0218226 | A1 | 8/2018 | Wellington et al. |
| 2018/0286228 | A1 | 10/2018 | Xu et al. |
| 2019/0225145 | A1 | 7/2019 | Sippl |
| 2019/0384302 | A1 | 12/2019 | Silva et al. |
| 2019/0385448 | A1* | 12/2019 | Montemurro ............... G08G 1/0112 |
| 2020/0233072 | A1* | 7/2020 | Osai ............... G07C 9/00309 |
| 2020/0312132 | A1 | 10/2020 | Cross et al. |
| 2020/0342760 | A1* | 10/2020 | Vassilovski ............... G08G 1/161 |
| 2020/0402397 | A1 | 12/2020 | Yamazaki et al. |
| 2022/0095316 | A1* | 3/2022 | Cross ............... G08G 1/09675 |

FOREIGN PATENT DOCUMENTS

| | | |
|---|---|---|
| DE | 19748174 A1 | 5/1999 |
| EP | 1845503 A2 | 10/2007 |
| GB | 2312215 A | 10/1997 |
| JP | 2000011448 A | 1/2000 |
| JP | 2003051215 A | 2/2003 |
| JP | 2003516343 A | 5/2003 |
| JP | 2004030082 A | 1/2004 |
| JP | 2011186697 A | 9/2011 |
| JP | 2012003602 A | 1/2012 |
| JP | 2012155477 A | 8/2012 |
| JP | 2014224715 A | 12/2014 |
| JP | 2016110413 A | 6/2016 |
| JP | 2018500661 A | 1/2018 |
| KR | 1020060107262 A | 10/2006 |
| KR | 1020180067471 A | 6/2018 |

OTHER PUBLICATIONS

International Search Report and Written Opinion in PCT/US2012/044474, mailed Jan. 7, 2013, 9 pages.

International Search Report and Written Opinion in PCT/US2016/057954, mailed Feb. 14, 2017, 9 pages.

International Search Report and Written Opinion in PCT/US2019/022302, mailed Jul. 2, 2019, 10 pages.

International Search Report and Written Opinion in PCT/US2019/055410, mailed Jan. 29, 2020, 7 pages.

International Search Report and Written Opinion in PCT/US2019/066472, mailed Apr. 17, 2020, 12 pages.

International Search Report and Written Opinion in PCT/US2020/021160, mailed Jul. 2, 2020, 10 pages.

International Search Report in PCT/US2020/067712, mailed Apr. 27, 2021, 3 pages.

Tonguz O., "Red Light, Green Light—No Light: Tomorrow's communicative cars could take turns at intersections," IEEE Spectrum, 2018, vol. 55, No. 10, pp. 24-29.

TravelSafely Brochure, "Connected Vehicle & Smart City Solutions, The future of connected vehicles is in your hands," Applied Information, 2017, [retrieved on May 22, 2018]. Retrieved from the Internet: <URL:http://appinfoinc.com/wp-content/uploads/2017/12/ts-brochure-1217.pdf>, 3 pages.

TravelSafely Infographic, "How TravelSafely Works," by Applied Information, 2017, [retrieved on Jun. 22, 2019]. Retrieved from the Internet: <URL:http://appinfoinc.com/wp-content/uploads/2017/09/TravelSafely-Infographic.pdf>, 1 page.

\* cited by examiner

SYSTEMS AND METHODS FOR TRAFFIC PRIORITY SYSTEMS

CROSS-REFERENCE TO RELATED APPLICATIONS

This application is a Continuation of U.S. Utility patent application Ser. No. 17/533,600, filed Nov. 23, 2021, which is a Continuation of U.S. Utility patent application Ser. No. 16/597,538, filed Oct. 9, 2019, now issued as U.S. Pat. No. 11,202,302 on Dec. 14, 2021, which claims benefit of U.S. Provisional Patent Application No. 62/743,281, filed Oct. 9, 2018. The entire disclosure of all the above documents is incorporated herein by reference.

BACKGROUND OF THE INVENTION

Field of the Invention

This disclosure is related to the field of traffic signal and control systems, and more specifically to systems and methods for facilitating traffic priority control using optical and radio signals, personal smart devices, and other hardware systems.

Description of the Related Art

As the number of mass transit routes and light rail lines throughout metropolitan areas increases, so does the potential for transit, worker, and pedestrian accidents. Despite improvements in signals, controls, and communication technology, the incidence of fatal collisions continues to be problematic. Workers, pedestrians, bicyclers, and motorists are all at risk.

These risks are particularly acute in the era of mixed-use roadways. A single street may need to accommodate commuter vehicles, light rail, bicyclists, street sweepers, snowplows, and emergency vehicles. Each vehicle has its own unique needs in using the roadway.

Specifically, there are circumstances in which certain vehicles should receive priority access to intersections. Examples include emergency vehicles, such as fire trucks and law enforcement vehicles. These vehicles are generally equipped with lights and auditory alerts to warn other vehicles that the emergency vehicles are approaching the intersection. When drivers are licensed, drivers are taught that emergency vehicles have priority, and that other traffic should make way and stay out of intersections to avoid collisions. Regardless, emergency vehicle warnings are often missed by users, particularly when listening to loud music or otherwise distracted from the road.

To alleviate this, it is preferable that the traffic light signals be changed to accommodate the oncoming approach of an emergency vehicle, ideally setting all lights to red so that no vehicle may pass, leaving the intersection clear for the emergency vehicle. These systems may also be used to provide preferential treatment to other vehicles that are preferred in a given traffic planning environment, such as mass transit vehicles like city buses, or rail vehicles in a mixed mode transportation grid. Similarly, controlling the traffic signals may better improve traffic flow based upon the license type or other permissions granted to the operator of specific vehicles. For example, a city may wish to provide priority access via special lanes or other treatment to vehicles designated as carpool vehicles, particularly during high congestion traffic times, such as morning and afternoon commutes.

Such systems exist and generally work by installing an intersection control computer to operate the traffic signals at a given intersection, and communicating with that computer via a remote transmitter in the approaching vehicle. This works by the vehicle transmitting to the intersection in advance that it is approaching, and requesting a change of the lights. The traffic signals may then alter their state so that the direction of travel of the approaching vehicle is green and all other vehicles are stopped. A common way that this is implemented is by use of optical systems. For example, the approaching emergency vehicle may have a high powered strobe emitter located on the forward side of the vehicle that generates light pulses at a specific frequency. A receiver on the light signal is configured to receive and detect these light pulses, generally using a photo detector, with appropriate filters to reduce optical interference from other sources of electromagnetic radiation. The advantage to such optical signals is that the approaching vehicle may be detected from a much greater distance than the range of conventional short range radio technologies, such as Bluetooth and Wi-Fi, both of which have ranges limited to several hundred feet, at best. Given the speed of a typical emergency vehicle, by the time that a signal could be transmitted using such technologies, the signal light state cannot be safely changed in sufficient time to allow the vehicle to pass, losing the benefits of the system.

Moreover, priority for emergency vehicles does nothing to improve traffic flow through the intersection. Instead, such systems will commonly impede it. In the perfect commuter utopia, signal lights would automatically switch to green every time a driver's vehicle approached an intersection, creating an unobstructed pathway towards the driver's final destination. In real life though, hitting a red light is a normal and inevitable part of any driver's commute. With the growth of modern cities and the reliance of much of the population on mass transit and personal automobiles for transportation, efficient control of the ebb and flow of traffic through efficient and smart signal light control and coordination systems has become increasingly important.

There are many substantial benefits to be reaped from improved traffic flow for personal, mass transit, and emergency motor vehicles. For many commuters, reclaiming part of their day would enhance their quality of life. Further, less congestion on the roads would generate fewer accidents, thereby saving lives. Moreover, traffic delays impinge on productivity and economic efficiency-time spent traveling to and from work is not time spent doing work. Further, many goods must be transported and many service providers must travel to their clients. Traffic delays all of these economic production factors. There is also a concern regarding the increased pollution that results from stop-and-go traffic flow in contrast to smooth flowing traffic. Further, longer commutes mean longer running times and entails more greenhouse gases. Also, congested traffic and uncoordinated signal lights can cause delays in the mass transit system which, if not remedied, can throw off an entire mass transit schedule grid and disincentivise individuals from using mass transit systems. For example, it has been demonstrated that schedule adherence for mass transit vehicles results in an increase in ridership. Lastly, the importance of prioritizing and efficiently moving emergency vehicles through traffic lights is axiomatic.

Currently, a variety of different control and coordination systems are utilized to ensure the smooth and safe management of traffic flows. One commonly utilized mechanism is the traffic controller system. In this system, the timing of a particular signal light is controlled by a traffic controller located inside a cabinet which is at a close proximity to the signal light. Generally, the traffic controller cabinet contains a power panel (to distribute electrical power in the cabinet); a detector interface panel (to connect to loop detectors and other detectors); detector amplifiers; a controller; a conflict motor unit; flash transfer relays; and a police panel (to allow the police to disable and control the signal), amongst other components.

Traffic controller cabinets generally operate on the concept of phases or directions of movement grouped together. For example, a simple four-way intersection will have two phases: North/South and East/West; a four-way intersection with independent control for each direction and each left-hand turn will have eight phases. Controllers also generally operate on the concept of rings or different arrays of independent timing sequences. For example, in a dual ring controller, opposing left-turn arrows may turn red independently, depending on the amount of traffic. Thus, a typical controller is an eight-phase, dual ring controller.

The currently utilized control and coordination systems for the typical signal light range from simple clocked timing mechanisms to sophisticated computerized control and coordination systems that self-adjust to minimize the delay to individuals utilizing the roadways.

The simplest control system currently utilized is a timer system. In this system, each phase lasts for a specific duration until the next phase change occurs. Generally, this specific timed pattern will repeat itself regardless of the current traffic flows or the location of a priority vehicle within the traffic grid. While this type of control mechanism can be effective in one-way grids, where it is often possible to coordinate signal lights to the posted speed limit, this control mechanism is not advantageous when the signal timing of the intersection would benefit from being adapted to the changing flows of traffic throughout the day.

Dynamic signals, also known as actuated signals, are programmed to adjust their timing and phasing to meet the changing ebb and flow in traffic patterns throughout the day. Generally, dynamic traffic control systems use input from detectors to adjust signal timing and phasing. Detectors are devices that use sensors to inform the controller processor whether vehicles or other road users are present. The signal control mechanism at a given light can utilize the input it receives from the detectors to adequately adjust the length and timing of the phases in accordance with the current traffic volumes and flows. The currently utilized detectors can generally be placed into three main classes: in-pavement detectors, non-intrusive detectors, and detectors for non-motorized road users.

In-pavement detectors are detectors that are located in or underneath the roadway. These detectors typically function similarly to metal detectors or weight detectors, utilizing the metal content or the weight of a vehicle as a trigger to detect the presence of traffic waiting at the light and, thus, can reduce the time period that a green signal is given to an empty road and increase the time period that a green signal is given to a busy throughway during rush hour. Non-intrusive detectors include video image processors, sensors that use electromagnetic waves or acoustic sensors that detect the presence of vehicles at the intersection waiting for the right of way from a location generally over the roadway. Some models of these non-intrusive detectors have the benefit of being able to sense the presence of vehicles or traffic in a general area or virtual detection zone preceding the intersection. Vehicle detection in these zones can have an impact on the timing of the phases. Finally, non-motorized user detectors include demand buttons and specifically tuned detectors for detecting pedestrians, bicyclists and equestrians.

Above and beyond detectors for individual signal lights, coordinated systems that string together and control the timing of multiple signal lights are advantageous in the control of traffic flow. Generally, coordinated systems are controlled from a master controller and are set up so that lights cascade in sequence, thereby allowing a group or "platoon" of vehicles to proceed through a continuous series of green lights. Accordingly, these coordinated systems make it possible for drivers to travel long distances without encountering a red light. Generally, on one-way streets, this coordination can be accomplished with fairly constant levels of traffic. Two-way streets are more complicated, but often end up being arranged to correspond with rush hours to allow longer green light times for the heavier volume direction. The most technologically advanced coordinated systems control a series of city-wide signal lights through a centrally controlled system that allows for the signal lights to be coordinated in real-time through above-ground sensors that can sense the levels of traffic approaching and leaving a virtual detection zone which precedes a particular intersection.

While cascading or synchronized central control systems are an improvement on the traditional timer controlled systems, they still have their drawbacks. Namely, priority vehicles in these systems are only able to interact with a virtual detection zone immediately preceding a particular intersection; there is no real-time monitoring of the traffic flows preceding or following this virtual detection zone across a grid of multiple signal lights. Stated differently, there is no real-time monitoring of how a vehicle or a group of vehicles travels through a traffic grid as a whole (i.e., approaching, traveling through and leaving intersections along with a vehicle's transit between intersections). Accordingly, these systems can provide for a priority vehicle, such as an emergency vehicle, to be accelerated through a particular signal at the expense of other vehicles, but they lack the capability to adapt and adjust traffic flows to keep a mass transit vehicle, or similar time scheduled vehicle, on time or adjust the lights in front of a mass transit vehicle to get it back on schedule. Virtual detection zone based systems only have the capability for control of a particular signal light to accelerate the movement of a single vehicle or a group of vehicles approaching that signal directly; they cannot offer an integrated control system with the capability of controlling the phases of multiple signal lights in a grid system, altering the length of particular phases at particular signal lights within the grid system to accommodate a particular vehicle traveling through the grid system according to a relatively fixed path and schedule.

Another problem with virtual detection zone based systems is their disruption of the overall traffic flow of the grid. As noted previously, detection zone based systems are focused on individual signal lights. If a priority vehicle is sensed in the virtual detection zone, the immediately upcoming light will either change to green to give the priority vehicle the right-of-way and potentially disrupt the entire system (something logical for allowing rapid passage of an emergency vehicle) or will not because the vehicle lacks sufficient priority to disrupt the system (as can be the case with a mass transit vehicle) simply to beat the next signal.

What some detection zone based systems fail to take into account is the impact this immediate change in an immediately approached signal light phase, irrespective of other traffic at the light, has on the overall traffic flows of the grid as a whole. Thus, while aiding in getting a particular priority vehicle through an intersection, these systems can, on a broader basis, add to, rather than decrease, the traffic levels in a given area at a given time. Further, because of their focus on a single signal light and vehicles approaching a single signal light, these systems are generally incapable of adjusting a series of lights within the traffic grid based upon a vehicle's current position, speed, schedule and path of travel.

Another frequent traffic problem which cannot be addressed by these commonly utilized virtual detection zone based systems is mass transit vehicle bunching, also known as bus bunching or some clumping. Bunching refers to a group of two or more transit vehicles along the same route, which are scheduled to be evenly spaced, such as buses, catching up with each other and, thus, running in the same location at the same time. Generally, bunching occurs when at least one of the vehicles is unable to keep to its schedule and therefore ends up in the same location as one or more other vehicles on the same route. Thus, the lead mass transit vehicle in the bunch typically slows to pick up passengers that would otherwise be boarding the trailing mass transit vehicle. This leads to overcrowding and further slowing of the lead vehicle. Conversely, the trailing mass transit vehicle encounters fewer passengers and, soon, both mass transit vehicles are in full view of each other—to the dismay of passengers on the overcrowded and behind schedule vehicles. It is no surprise that bunching is a leading complaint of regular transit riders and a headache for those operating and managing transit services. The currently utilized detection zone based systems—with their control methodology localized to individual lights—are simply incapable of controlling or preventing bunching.

Another failing of the currently utilized detection zone based systems is their inability to modify the conditions under which a vehicle may request priority. For example, under many of these currently utilized systems, priority is given to any flagged vehicle that enters a detection zone and is sensed by a detector (such as an in-pavement detector). These systems are generally incapable of granting priority on a more nuanced and conditional basis such as only granting priority when another mass transit vehicle has not requested priority within a specified time frame or only granting priority when an exit request has not been made for the next stop.

Accordingly, there is a need in the art for traffic control systems that operate signal lights based on the type of vehicle, the status of the vehicle, the operator of the vehicle, and other details of that vehicle's operation at the particular time that priority is being selected, approaching the intersection.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a hardware vehicle control unit which is configured with data concerning the type of vehicle in which it is located, and/or the identity or type of user associated with the vehicle. Described herein, among other things, are several improvements to prior art systems. These include the use of a mobile user device to identify the individual operating a vehicle, which, in conjunction with a vehicle computer unit or vehicle control unit may be used to establish vehicle priority in connection with traffic control systems. Second, described herein is the use of secondary or multiple transmitters to operate traffic control systems, including, but not limited to, the use of LED-based transmitters as a primary or secondary traffic control communication systems. Third, described herein is a zone-based optical control system which may use optical transmitters in various detection zones, such as to signal the approach of a vehicle using a first, broadband transmission system, and then upon entering a particular zone, switch to an optical or other line of sight based system.

Described herein, among other things, is a vehicle computer unit (VCU). The described VCU may be an add-on unit. The VCU may facilitate the implementation of traffic priority systems based on optical signals which can be retrofitted to allow the systems to operate in a dual mode optical/GPS signal arrangement such that cities can incrementally switch from optical signal transmitters in vehicles to GPS based transmitters.

In an embodiment, a smart phone is used to connect to a specific vehicle. This provides links to a specific vehicle, and to specific data about the specific vehicle. This also allows for a dynamic registration when the user of the vehicle is on duty.

In an embodiment, the system includes a collision detection facility.

In an embodiment, an optical wireless system is implemented.

There is also described herein, a system for assisting an individual in a vehicle through an intersection, the system comprising; a vehicle, said vehicle including a vehicle control unit (VCU) configured to interface with a priority detector at an intersection; and a mobile communication device under control of an individual within said vehicle, said mobile communication device configured to receive an alert, said alert indicating that said individual needs priority access through said intersection; wherein, upon receipt of said alert at said mobile communication device, said mobile communication device notifies said vehicle control unit of said individual's need for priority through said intersection; wherein, only after said notification of said vehicle control unit, said vehicle control unit notifies said priority detector of said need for priority; and wherein, only after said notification of said priority detector, said priority detector alters operation of signals at said intersection to give said vehicle priority through said intersection.

In an embodiment of the system, the mobile communication device comprises a smartphone.

In an embodiment of the system, the vehicle is not owned by said individual.

In an embodiment of the system, the vehicle is not controlled by said individual.

In an embodiment of the system, the individual is a passenger in said vehicle.

In an embodiment of the system, the vehicle is an autonomous vehicle.

There is also described herein, a method for assisting an individual in a vehicle through an intersection, the method comprising; providing a mobile communication device under control of an individual; placing said individual within a vehicle including a vehicle control unit (VCU) configured to interface with a priority detector at an intersection; receiving an alert at said mobile communication device, said alert indicating that said individual needs priority access through said intersection; in response to receiving said alert at said mobile communication device, said mobile communication device notifying said vehicle control unit of said individual's need for priority through said intersection; in response to receiving said notification at said vehicle control unit, said vehicle control unit notifies said priority detector of said need for priority; and in response to receiving said notification at said priority detector, said priority detector alters operation of signals at said intersection to give said vehicle priority through said intersection.

In an embodiment of the method, the mobile communication device comprises a smartphone.

In an embodiment of the method, the vehicle is not owned by said individual.

In an embodiment of the method, the vehicle is not controlled by said individual.

In an embodiment of the method, the individual is a passenger in said vehicle.

In an embodiment of the method, the vehicle is an autonomous vehicle.

There is also described herein, a method for assisting an individual in a vehicle through an intersection, the method comprising; providing a mobile communication device under control of an individual; placing said individual within a vehicle not including a vehicle control unit (VCU); receiving an alert at said mobile communication device, said alert indicating that said individual needs priority access through an upcoming intersection; in response to receiving said alert at said mobile communication device, said mobile communication device notifying a priority detector at an intersection of said individual's need for priority through said intersection; and in response to receiving said notification at said priority detector, said priority detector alters operation of signals at said intersection to give said vehicle priority through said intersection.

In an embodiment of the method, the mobile communication device comprises a smartphone.

In an embodiment of the method, the vehicle is not owned by said individual.

In an embodiment of the method, the vehicle is not controlled by said individual.

In an embodiment of the method, the individual is a passenger in said vehicle.

In an embodiment of the method, the vehicle is an autonomous vehicle.

DESCRIPTION OF THE PREFERRED EMBODIMENT(S)

Figure 1:
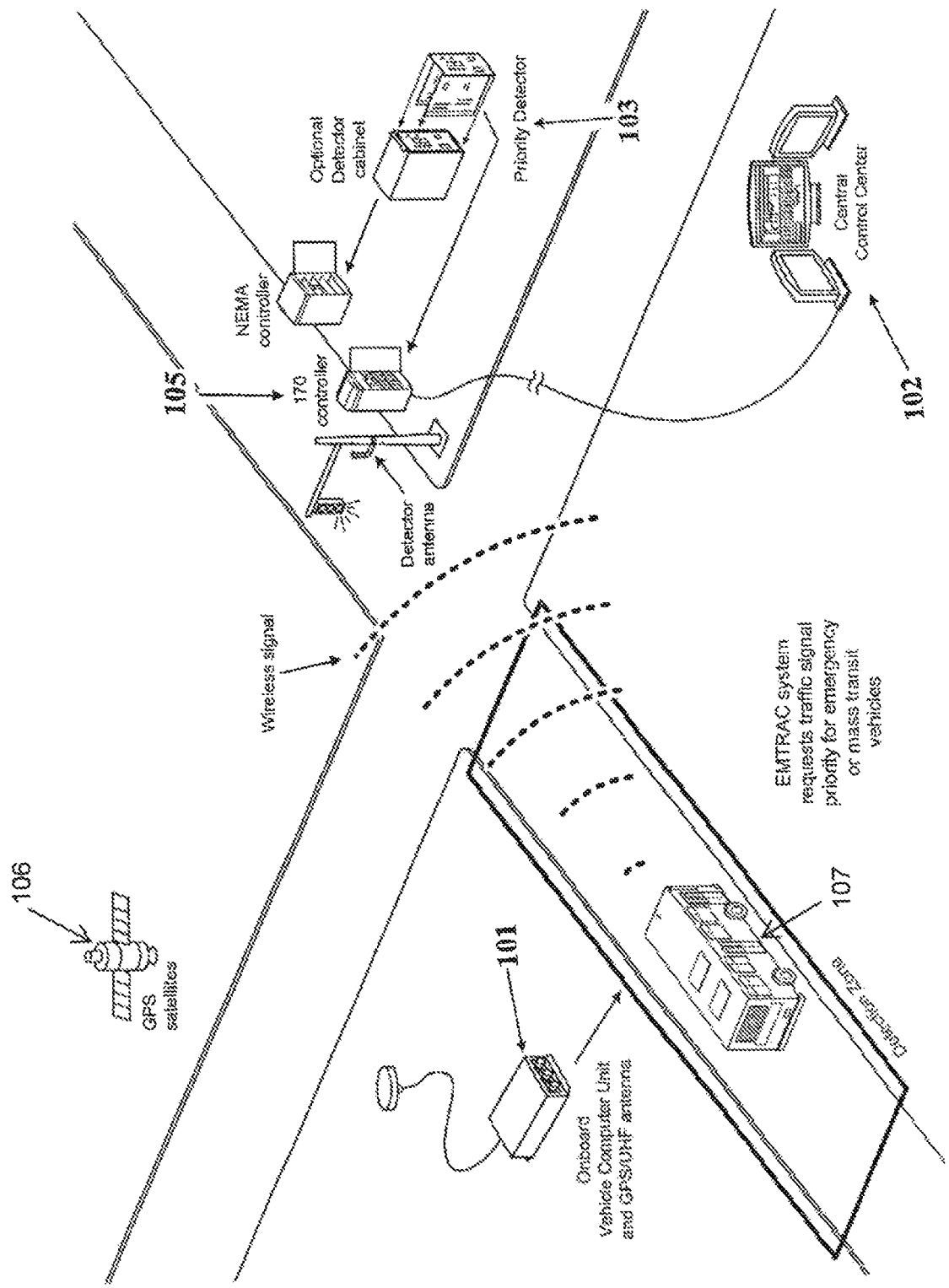
FIG. 1 provides a diagram of an embodiment of the fixed geographic detection method.

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

This disclosure is intended to teach by way of example and not by way of limitation. As a preliminary matter, it should be noted that while the description of various embodiments of the disclosed system will discuss the movement of various special-purpose vehicles (such as, but not limited to, emergency vehicles, maintenance vehicles, and mass transit vehicles, buses, light rail trains, and street cars) through signal lights, this in no way limits the application of the disclosed traffic control system to such uses. Any vehicle which could benefit from the traffic control systems and methods described herein is contemplated.

In a broad sense, the traffic control system and methods described herein use the competing power and functions of a personal mobile device specific to an individual to assist, often in conjunction with a vehicle computer and specific to a vehicle, in making decisions about traffic signal operations. The location and movement of the mobile device may be used as a proxy for a combined systems vehicle's real-time location and velocity within a traffic grid, allowing for vehicle priority to be established on an ad hoc basis. This assists with maintaining a fixed schedule with minimal interruption to other grid traffic. The system disclosed herein also allows for the display of maps of vehicle and intersection activity on centrally-located monitors or in a vehicle (e.g., via the mobile device) in real-time and for the creation of detailed logs and reports of traffic flow patterns and activity in real-time for monitoring personnel.

Throughout this disclosure, the term "computer" describes hardware which generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, cell phones, mobile phones, smart phones, tablet computers, server farms, hardware appliances, minicomputers, mainframe computers, video game consoles, handheld video game products, and wearable computing devices including, but not limited to eyewear, wristwear, pendants, fabrics, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, can refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices which are not conventionally thought of as "computers" nevertheless exhibit the characteristics of a "computer" in certain contexts. Where such a device is performing the functions of a "computer" as described herein, the term "computer" includes such devices to that extent. Devices of this type include, but are not limited to: network hardware, print servers, file servers, NAS and SAN, load balancers, and any other hardware capable of interacting with the systems and methods described herein in the matter of a conventional "computer."

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including, without limitation, virtual processors, or by the use of run-time environments, virtual machines, and/or interpreters. Those of ordinary skill in the art recognize that software can be wired or embedded into hardware, including, without limitation, onto a microchip, and still be considered "software" within the meaning of this disclosure. For purposes of this disclosure, software includes, without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth® and other wireless communication devices, virtual memory, storage devices and associated controllers, firmware, and device drivers. The systems and methods described here are contemplated to use computers and computer software typically stored in a computer- or machine-readable storage medium or memory.

Throughout this disclosure, the term "network" generally refers to a voice, data, or other telecommunications network over which computers communicate with each other. The term "server" generally refers to a computer providing a service over a network, and a "client" generally refers to a computer accessing or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms "server" and "client" may refer to endpoints of a network communication or network connection, including, but not necessarily limited to, a network socket connection. Those having ordinary skill in the art will further appreciate that a "server" may comprise a plurality of software and/or hardware servers delivering a service or set of services. Those having ordinary skill in the art will further appreciate that the term "host" may, in noun form, refer to an endpoint of a network communication or network (e.g., "a remote host"), or may, in verb form, refer to a server providing a service over a network ("hosts a website"), or an access point for a service over a network.

Throughout this disclosure, the term "transmitter" refers to equipment, or a set of equipment, having the hardware, circuitry, and/or software to generate and transmit electromagnetic waves carrying messages, signals, data, or other information. A transmitter may also comprise the componentry to receive electric signals containing such messages, signals, data, or other information, and convert them to such electromagnetic waves. The term "receiver" refers to equipment, or a set of equipment, having the hardware, circuitry, and/or software to receive such transmitted electromagnetic waves and convert them into signals, usually electrical, from which the message, signal, data, or other information may be extracted. The term "transceiver" generally refers to a device or system that comprises both a transmitter and receiver, such as, but not necessarily limited to, a two-way radio, or wireless networking router or access point. For purposes of this disclosure, all three terms should be understood as interchangeable unless otherwise indicated; for example, the term "transmitter" should be understood to imply the presence of a receiver, and the term "receiver" should be understood to imply the presence of a transmitter.

For purposes of this disclosure, there will also be significant discussion of a special type of computer referred to as a "mobile communication device" or simply "mobile device". A mobile communication device may be, but is not limited to, a smart phone, tablet PC, e-reader, satellite navigation system ("SatNav"), fitness device (e.g. a Fitbit™ or Jawbone™) or any other type of mobile computer, whether of general or specific purpose functionality. Generally speaking, a mobile communication device is network-enabled and communicating with a server system providing services over a telecommunication or other infrastructure network. A mobile communication device is essentially a mobile computer, but one which is commonly not associated with any particular location, is also commonly carried on a user's person, and usually is in near-constant real-time communication with a network.

The system utilizes a "positioning system" which is any form of location technology such as GPS, Glonass, or similar technology, as well as inertial and other positioning systems, and wireless communication to enable transit vehicles to report location and activity data to traffic controllers and/or central locations in real time. Further, the system enables dispatchers or other monitoring personnel at a centralized or secondary remote location to see the location of key vehicles in and/or personnel traffic grid. The system also allows for the generation and sending of automatic or manual alerts to notify vehicle operators of changes in route status.

However, any wireless methodology for transferring the location data created by the VCU (101) to the other component parts of the system to which it is communicatively networked is contemplated. Thus, contemplated wireless technologies include, but are not limited to, telemetry control, radio frequency communication, microwave communication, GPS and infrared short-range communication.

Figure 2:
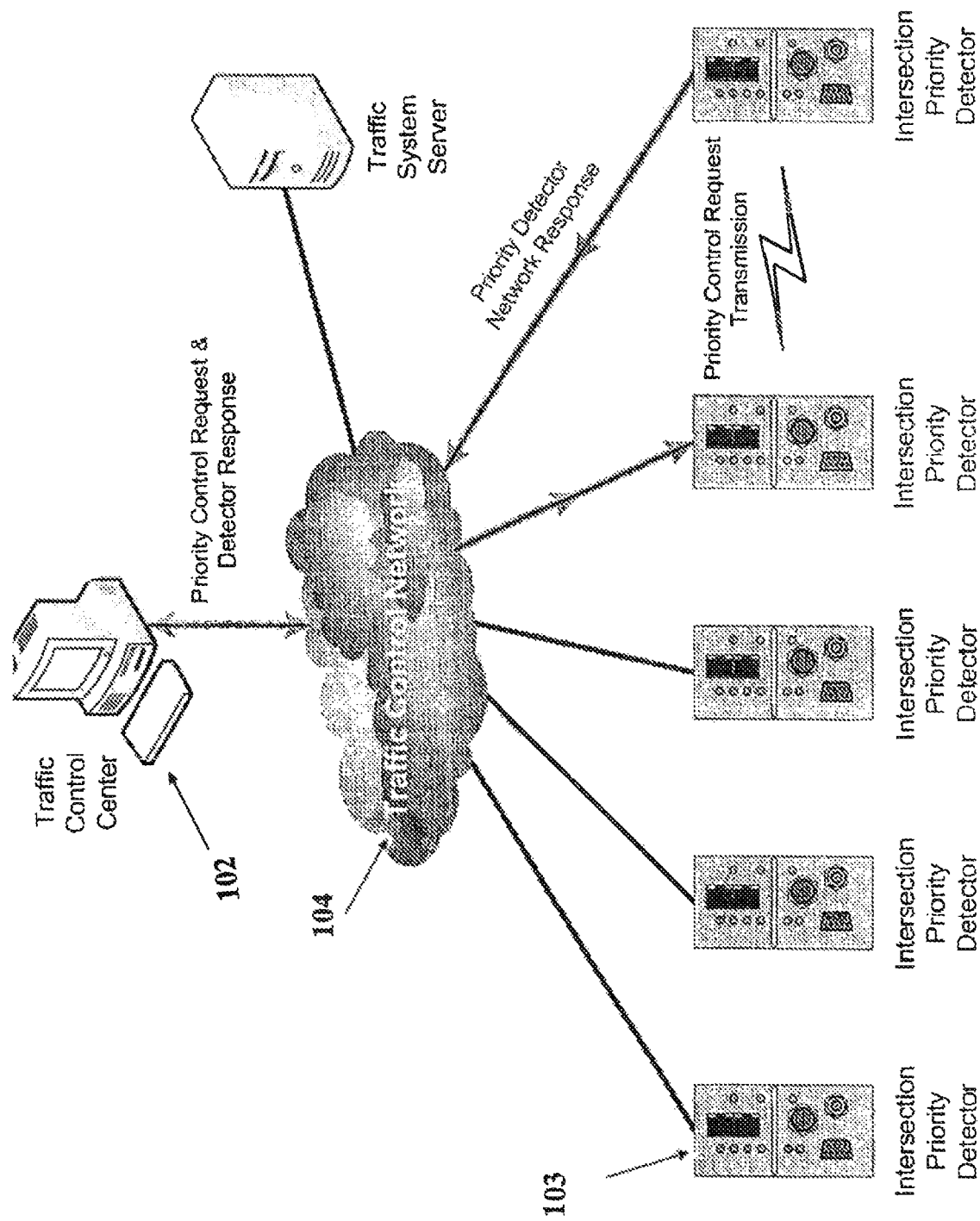
FIG. 2 provides a communication diagram of how traffic components interface through the traffic control network of a priority system in an embodiment in which the system has a centralized server.
Figure 3:
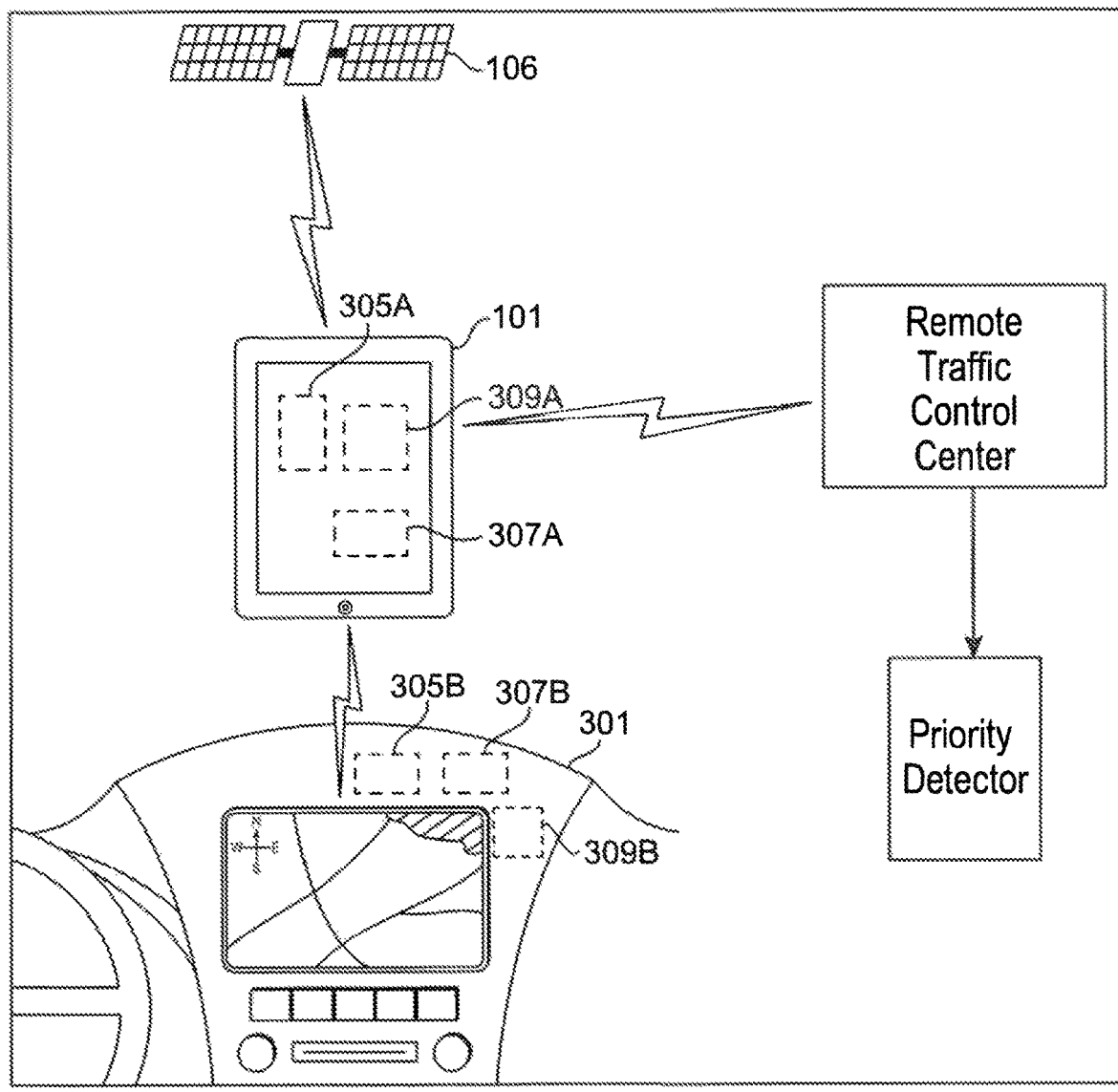
FIG. 3 depicts an embodiment of a traffic light system using a mobile smart device.

The traffic control system described herein is an improvement upon systems described in U.S. Pat. Nos. 8,878,695, 8,773,282, 9,330,566 and 9,916,759. The entire disclosure of all of these documents is incorporated herein by reference. An embodiment is shown in FIGS. 1-3. In the depicted embodiment, the hardware components include a vehicle equipment unit/vehicle computer unit (VCU) (101) installed associated with one or more vehicles, and a priority detector (103) installed in or near signal control cabinets (along with a cabinet- or pole-mounted antenna). The main hardware components of the system, such as the VCU (101) and the priority detector (103) generally communicate wirelessly using secure frequency hopping spread spectrum radio. The mobile-vehicle mounted hardware components, such as the VCU (101), utilize a positioning system (106) to continually determine the real-time location of the VCU (101), and, by extension, the vehicle with which it is associated.

As shown in FIG. 1, the VCU (101) is associated with a monitored vehicle (107) in a traffic grid. As noted previously, contemplated monitored vehicles (107) include, but are not necessarily limited to, mass transit vehicles (buses, trains, light rail, etc.), emergency vehicles (fire trucks, police cars, ambulances, etc.), waste management vehicles, and road maintenance vehicles. It should be understood that the system disclosed herein contemplates the installation of one or more VCUs (101) in various vehicles traveling and operating in the traffic grid.

Generally, the VCU (101) serves several functions in the disclosed traffic control system. The VCU (101) determines the real-time location data for the vehicle (107) with which it is associated. This data includes the vehicle's (107) velocity and coordinates. In certain embodiments, the VCU (101) may also include a map of the traffic grid and, if applicable, a map and schedule of its associated vehicle (107). The VCU (101) may also include maps or schedules of other vehicles in the grid. The VCU (101) also is capable of sending information regarding its velocity, location, and other data to other components of the system to which it is communicatively attached, including a remote traffic control center (102), a plurality of secondary control centers (106), a plurality of other VCUs (101), and/or a plurality of priority detector units (103).

In addition, the depicted VCU (101) is capable of receiving information from these other components in the system. The VCU (101) determines the velocity and location of its attached vehicle in the overall traffic grid, transmits this information or utilizes it to make decisions about traffic flow and priority at various points in the traffic grid, and transmits and receives information regarding the position of the vehicle (107) within the traffic grid to other component parts of the system.

One contemplated component part of the VCU (101) is a receiver (305A) and (305B) for a positioning/navigation system (106). Generally, any positioning system (106) known or later developed is contemplated including, but not limited to, GPS, the Russian Global Navigation Satellite System (GLONASS), the Chinese Compass navigation system and the European Union's Galileo positioning system. Further, any receiver (305A) and (305B) technology known to those of skill in the art that is able to calculate its real-time position by precisely timing the signals sent by satellites, or by any other methodology known to those of ordinary skill in the art, is a contemplated receiver (305) in the disclosed system. The installation of the receiver (305A) and (305B) can be either permanent, by direct integration into the vehicle (305B), or temporary, through a mobile receiver (305A) that can be taken into and removed from the vehicle.

Generally, the receiver (305A) and (305B) of the VCU (101) functions to determine the vehicle's (107) position, direction and velocity in real-time at any given point during its travels. In alternative embodiments, it is contemplated that the VCU (101) will determine its position, direction and velocity through internal navigation systems known to those of ordinary skill in the art alternatively, such as vehicle telematics systems (301) or in addition to, satellite positioning driven systems (106). Contemplated internal navigation systems include, but are not limited to, gyroscopic instruments, wheel rotation devices, accelerometers, radio navigation systems, and others. It should also be clear that a vehicle telematics system (301) may provide a satellite-based positioning service (206).

In addition to a receiver (305A) and (305B), the VCU (101) generally includes a computer (307A) and (307B) capable of transferring location data, coordinates, and speed of the vehicle (107) to the other components of the system. Another contemplated component of the VCU (101) is a transceiver (309A) and (309B). Generally, any device for the transmission and receiving of radio signals including, but not limited to, the FHSS and/or FH-CDMA methods of transmitting radio signals is contemplated, as well as any of the IEEE wireless communication standards.

Generally, the VCU (101) will be programmed with preferred vehicle response settings, applicable intersections, the vehicle's schedule, a map of the overall grid, and vehicle detection zones for applicable signal lights in the grid. In certain embodiments, it is contemplated that the VCU (101) will include a user interface known to those of ordinary skill in the art. Among other things, this user interface will provide a view of the map of the overall grid, vehicle detection zones for applicable signal lights in the grid, and the location of other VCU-equipped vehicles in the grid. Another second component of the traffic control system described herein is a plurality of priority detector units (103).

Generally, the VCUs (101) and priority detector units (103) are connected by wireless communication system that allow for the free exchange of data and information between these components through a traffic control network (104). One embodiment of this traffic control network (104) is provided in FIG. 2. In this embodiment, the network (104) will typically provide an estimated time of arrival (ETA) for a vehicle, but that is by no means required. The network (104) communicatively connects the different components of the system. In the embodiment depicted in FIG. 2, the network (104) connects a plurality of intersection priority detectors (103), the signal light controllers (105) located in the grid (also referred to as the traffic system servers) and the remote traffic control center (102).

The functions and methods of such a network and the associated devices, particularly as operating in an ETA mode, are described in more detail in U.S. Pat. Nos. 8,878, 695, 8,773,282, 9,330,566 and 9,916,759. For example, various methods of estimating time of arrival may be implemented. Also, features such as conditional transit signal priority, automatic vehicle location, and vehicle activity monitoring, may be implemented.

In an embodiment, such as that depicted in FIG. 3, the system may be supplemented, augmented and/or substituted in whole or part, by a user device or a mobile user device. An exemplary embodiment of one such device (701) is depicted in FIG. 3. In the depicted embodiment, the device (701) is a smart phone (701), which comprises a number of components familiar to a person of ordinary skill in the art. These include, but are not limited to, a physical port (713), a display screen (709), a location or positioning system, such as a GPS transmitter (703), a memory (705), one or more transceivers (707), such as Wi-Fi or Bluetooth transceivers (707), as well as a microprocessor and other circuitry and components. Many of these components may be used to replace, supplement, or complement the components of the vehicle, or the VCU (101). For example, the VCU (101) depicted in FIG. 4 comprises a GPS receiver (110) connected to a GPS antenna (112). Similarly, the depicted VCU (101) comprises a vehicle computer (114), which generally is a microprocessor. In the depicted embodiment of FIG. 4, the VCU (101) may be supplemented with, or replaced by, the user device (701).

For example, in a simple embodiment, the user device (701) may function as the VCU (101) in its entirety, such as in a vehicle without a VCU. In such a circumstance, a user carrying a user device (701) upon entering the vehicle would manipulate the user device (701) to connect the user device (701) to the remote traffic control system or center (102) or (106), and/or the positioning system (703) of the user device (701) would communicate with external components of the positioning system, such as a satellite (116), as necessary to acquire the location of the vehicle. Because the user device (701) is located within the vehicle with the driver, the location of the user device (701) is a reasonably accurate proxy for the location of the vehicle. Likewise, the user device (701) would generally undergo the same directional and velocity changes of the vehicle in which it is traveling. Thus, in such an embodiment, the VCU (101) may be replaced by the user device (701).

It will be readily understood by a person of ordinary skill in the art that each individual driver or user may carry his or her own different user device (701). Thus, the user device (701) may be configured to have software for communicating with the remote traffic control system or center (102) or (106). This may be done in advance by downloading such software to the user device (701) or otherwise installing such software on the user device (701). Techniques for doing so are familiar to a person of ordinary skill in the art.

The user device (701) then may be connected to the remote traffic control center (102) or (106) via a wireless communication connection, such as over a cellular network, or the same network as the VCU (101). Once this connection is made, the user device (701) may be set aside, and the software on the user device (701) will operate in a similar manner to the functions implemented by the VCU (101) described elsewhere herein. For example, the software may operate a GPS transmitter (703) to communicate with the satellite system (116) to provide locational information concerning the user device (701), and cause the user device (701) to communicate with the remote traffic control center (102) or (106) as described elsewhere herein.

The use of a user-specific device (701) presents other advantages as well. Generally, a user device (701) contains data or other information identifying a specific user to whom the device belongs or is assigned. The information is generally accessible or made available to software installed on the user device (701). Thus, in the depicted embodiment of FIG. 4, this user-specific information may be usable to identify which specific user is operating the vehicle. This identity may in turn be used to make priority determinations, either locally at the user device (701) or by transmitting this information to the remote traffic control center (102) or (106). For example, if the driver is identified as a high priority user, such as a foreman or manager, traffic priority may be altered to allow rapid passage.

By way of example and not limitation, suppose the circumstance of an emergency room physician riding as a passenger in a vehicle which belongs to somebody else. This could be the private vehicle of a friend or colleague, or a public vehicle such as a city bus or train. In the illustrative example, the vehicle itself is not equipped with a VCU (101), but a personal mobile device of the doctor can serve this function. For example, the physician may receive a page, text, or other notification or alert of an emergency condition, which causes software on a mobile device to operate in VCU mode. In this mode, the software can operate to communicate with the remote traffic control center (102) or (106) as described elsewhere herein, allowing the vehicle in which the doctor is a passenger to be quickly routed to the necessary destination, such as a hospital, or other location of an emergency. For example, the emergency could be a roadside accident in which medical help is needed. Ultimately, the personal device of the user in question is able to operate as a VCU, when the user is not in the user's personal vehicle or ordinary vehicle, and the vehicle in which the user is located does not have VCU capability. This same basic functionality is applicable to any number of other emergency circumstances, including, but not limited to, law enforcement, military, espionage, and Amber Alerts. It should also be recognized that the ability of the individual user to provide the need for priority to the vehicle because of their presence within it, priority can be provided to specific individuals in ride-sharing circumstances or if the user is utilizing public vehicles such as buses or mass transit vehicles, or is utilizing an autonomous vehicle. The user can also provide priority regardless of whether or not they own the vehicle, control the vehicle, or are simply utilizing the vehicle temporarily.

Alternatively, the user device (701) may be used in conjunction with a VCU (101). This may be done by the user device (701) communicating with the VCU (101) and providing supplementary or complementary functions, but not completely replacing the VCU (101). This connection may be established wirelessly, such as by using a Wi-Fi™ or Bluetooth™ transceiver (707) to connect to or communicate with a corresponding transceiver (118) in the VCU (101). Alternatively, a physical port (713) may be connected or coupled to the VCU (101) via a wire or cable (711). In a further embodiment, the wired connection (711) may be made by connecting the user device (701) into the OCI port of the vehicle. In either case, the connection may be used to exchange data between the user device (701) and the VCU (101). The process of negotiating this connection may include an authentication of the user device (701) and/or user as being permitted to operate or control the vehicle or the VCU (101). For example, a fingerprint or voice authentication ID may be required using the user device (701).

In an embodiment, it may be necessary or appropriate to provide functionality to reduce, inhibit, or avoid fraudulent use of the system for improper purposes. For example, it is generally desirable to prevent emergency workers from enabling their mobile devices to be in VCU mode in order to quickly route themselves to a desired location when there is not emergency currently taking place. In an embodiment, the VCU software on the mobile device is programmed to enter into VCU mode only upon receipt of a properly authenticated or otherwise verified alert, message, or notification from an appropriate source indicating an emergency of the appropriate nature for the user of the device. By way of example, and not limitation, if the device receives an Amber Alert, but the user is the driver of a street sweeper, this type of message does not merit the use of VCU mode on the user's device to get to a street sweeper more quickly. However, if the user is a police detective, this type of emergency may justify the use of VCU mode on the user's mobile device. Additionally, the software on the mobile device may be programmed to create detailed records and logs of the messages received, and/or the use of the mobile device as a VCU in order to provide an audit trail for later confirmation and review of the appropriateness of each use. In this way, it is possible for a supervisor or administrator to determine that the use of the mobile device in VCU mode was appropriate in each circumstance for the particular user.

To prevent tampering or other fraud, these detailed audit records may be transmitted and stored at a central server or other remote location contemporaneously with the use of the mobile device in VCU mode.

Once this connection is made, the division of labor between the VCU (101) and user device (701) may be implementation-specific and vary from embodiment to embodiment. For example, in an embodiment, the GPS facilities of the VCU (101) may be used, and the vehicle computer (114) may communicate with the remote traffic control center (102) or (106). In such an embodiment, the user device (701) may be used to provide identification or credentialing information about the user of the user device (701). This data may then be used by the vehicle computer (114) to make decisions about prioritization, authorization, or other aspects of control of remote traffic control system based on identification of the user of the device (701).

Additionally, or alternatively, other facilities available via the user device (701) may be added to or incorporated into the functionality or features of the VCU (101). For example, it is common for user devices (701) to be pre-loaded with mapping software, which often includes traffic monitoring and independent estimated time of arrival calculations from one destination to another based upon waypoints provided by a user. These features are often accessible via an application programming interface (API). In an embodiment, software on the user device (701) may interface with mapping or traffic monitoring facilities of the user device (701) to provide additional information to the vehicle computer (114) of the VCU (101). This information may also be passed along to the remote traffic control center (102) or (106) where it may be aggregated and shared with other vehicle computers in the network in order to provide a more accurate and complete understanding of the overall state of the traffic grid. This information may in turn be used to alter or improve the accuracy of ETA calculations as described elsewhere herein.

Data about the identity and type of the vehicle based on the vehicle control unit (101), in combination with information about the identity of the driver as acquired by the user device (701), may be used in connection with the priority control systems described herein. For example, it is common in a municipal environment for a pool of specialized vehicle drivers to share responsibilities for operating various vehicles, ranging from street sweepers to snow plows to waste management vehicles. By knowing both the type of vehicle and the user driving the vehicle, more accurate decisions may be made concerning how to control the traffic systems. For example, if it is known that the driver is a foreman or supervisor, the traffic priority may be altered to allow passage, whereas it may not for an off-the-clock worker returning a vehicle to fleet storage. Also by way of example, and not limitation, suppose the situation where a regularly scheduled street sweeper is still working as rush hour approaches. It is desirable to remove this slower moving vehicle from the streets to prevent traffic bottlenecks during a busy time of the day. As such, the systems and methods described herein can be used to prioritize movement of the street sweeper through the traffic grid in order to more quickly conclude its route and get it off of the street. Also by way of example, and not limitation, in the case of a city bus or school bus which is running behind (or ahead), the systems and methods described herein can be used to prioritize (or deprioritize) passage of the vehicle to keep it on schedule. In such examples, the vehicle and driver are effectively treated as a single logical work unit, and the vehicle is prioritized based on its functional importance, or other characteristics, such as speed.

Figure 4:
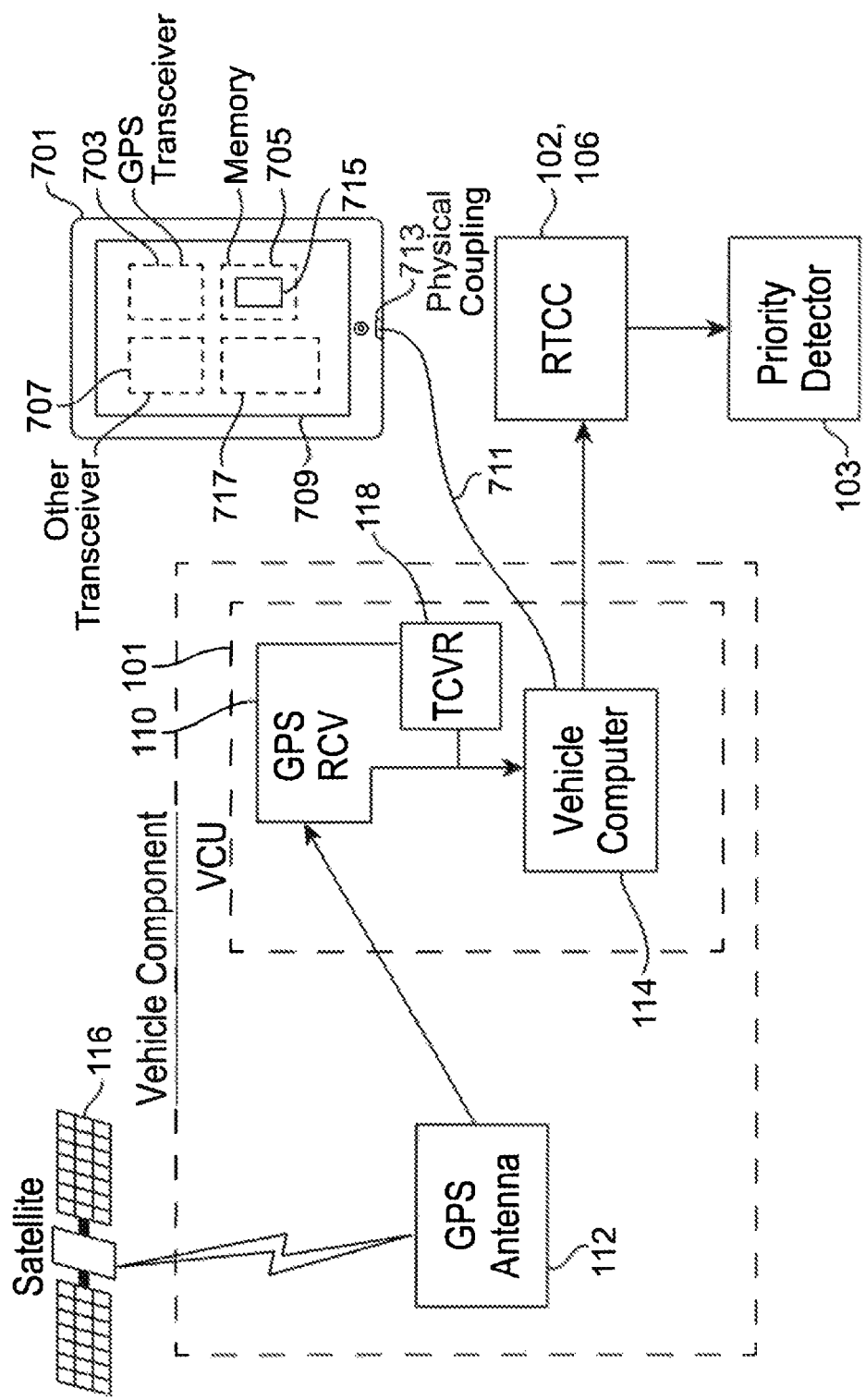
FIG. 4 depicts a block diagram of a traffic control system according to the present disclosure.

Although a smart phone (701) is depicted in FIG. 4, any number of other user device types are suitable for use, such as, without limitation, a wearable computing device, such as a smart watch, or a tablet or a laptop computer.

Also described herein is the use of one or more LED emitters in connection with an optical-priority system. As described elsewhere herein, it is known to use optical signaling in order to operate a traffic control system. However, optical signaling suffers from a number of limitations as compared to radio-based signaling. For one, radio waves can bend around intervening obstacles. Although this can alter the characteristics of the radio wave signals, the radio waves will nevertheless be received at the endpoint in some form, subject to interference. However, a blocked optical signal generally will not be received, and line of sight is usually required for the proper and reliable functioning of an optical signaling system.

In an embodiment, the system and methods described herein use optical control systems as a supplement or replacement for conventional radio-based control systems. It is contemplated that as a vehicle approaches an intersection, both optical and radio systems may be used simultaneously in order to communicate the approach of the vehicle. This allows for the strengths of each to overcome the weaknesses of each, improving accuracy and reliability. For example, in an embodiment, a radio-based signal may be transmitted in addition to an optical strobe. Thus, if the optical signal is blocked by an intervening obstruction, the radio signal may nevertheless arrive. By contrast, if the environment is electromagnetically hostile, the radio waves may not arrive intact, but if there is line of sight, the optical signal will.

In an embodiment, at least two or more different transmission systems are used. This may be, by way of example and not limitation, radio plus optical, or two different optical systems, such as analog plus LED, or redundant uses of the same system (e.g., radio plus radio, or LED plus LED). Each separate transmission may be made independently, may communicate the same, different, or partially the same and/or partially different data, depending upon the particular strengths and weaknesses of each communication system.

Described herein is the use of zone-based optical systems, in which an optical transmitter is used within a detection zone, but radio is used prior to the entrance into the detection zone, and then the system switches to the use of optical.

The qualifier "generally," and similar qualifiers as used in the present case, would be understood by one of ordinary skill in the art to accommodate recognizable attempts to conform a device to the qualified term, which may nevertheless fall short of doing so. This is because terms such as "sphere" are purely geometric constructs and no real-world component is a true "sphere" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric meaning of the term in view of these and other considerations.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The invention claimed is:

1. A system for assisting an individual in a vehicle through an intersection, the system comprising;
    a vehicle including an individual transported by said vehicle;
    a first communication device in said vehicle, said first communication device comprising a transceiver for notifying a priority detector at an intersection of said individual's need for priority through said intersection;
    a second communication device in said vehicle, said second communication device comprising a transceiver, for notifying a priority detector at an intersection of said individual's need for priority through said intersection;
    wherein, said first communication device initially notifies said priority detector of said individual's need for priority through said intersection a first distance from said intersection;
    wherein, said second communication device initially notifies said priority detector of said individual's need for priority through said intersection a second distance from said intersection, said second distance being less than said first distance; and
    wherein, in response to receiving either said notification at said priority detector, said priority detector alters operation of signals at said intersection to give said vehicle priority through said intersection.

2. The system of claim 1 wherein said transceiver in said first communication device comprises a radio-based transceiver.

3. The system of claim 2 wherein said transceiver in said second communication device comprises an optical transceiver.

4. The system of claim 1 wherein said transceiver in said second communication device comprises an optical transceiver.

5. The system of claim 4 wherein said transceiver in said first communication device comprises an optical transceiver.

6. The system of claim 1 wherein said first communication device comprises a smartphone.

7. The system of claim 6 wherein said second communication device comprises a Vehicle Control Unit (VCU).

8. The system of claim 1 wherein said second communication device comprises a smartphone.

9. The system of claim 8 wherein said second communication device comprises a Vehicle Control Unit (VCU).

10. The system of claim 1 wherein:
    said vehicle has a schedule with a specified scheduled arrival time at each of a plurality of specified destinations;
    at least one said first communication device and said second communication device determines said vehicle's estimated time of arrival at a next one of said specified destinations; and
    wherein at least one said first communication device and said second communication device notify each of multiple priority detectors between said first vehicle's current location and said next one of said specified destinations based upon said vehicle's estimated time of arrival at said next one of said specified destinations so that said vehicle arrives at said next one of said specified destinations closer to said specified scheduled arrival time for said next one of said specified destinations than if said modification did not occur.

11. A system for assisting an individual in a vehicle through an intersection, the system comprising;
    a vehicle including an individual transported by said vehicle;
    a first communication device in said vehicle, said first communication device comprising a transceiver for notifying a priority detector at an intersection of said individual's need for priority through said intersection;
    a second communication device in said vehicle, said second communication device comprising a transceiver, for notifying a priority detector at an intersection of said individual's need for priority through said intersection;
    wherein, said first communication device initially notifies said priority detector of said individual's need for priority through said intersection a first distance from said intersection;
    wherein, said second communication device initially notifies said priority detector of said individual's need for priority through said intersection a second distance from said intersection, said second distance being less than said first distance; and
    wherein, in response to receiving both said notifications at said priority detector, said priority detector alters operation of signals at said intersection to give said vehicle priority through said intersection.

12. The system of claim 11 wherein said transceiver in said first communication device comprises a radio-based transceiver.

13. The system of claim 12 wherein said transceiver in said second communication device comprises an optical transceiver.

14. The system of claim 11 wherein said transceiver in said second communication device comprises an optical transceiver.

15. The system of claim 14 wherein said transceiver in said first communication device comprises an optical transceiver.

16. The system of claim 11 wherein said first communication device comprises a smartphone.

17. The system of claim 16 wherein said second communication device comprises a Vehicle Control Unit (VCU).

18. The system of claim 11 wherein said second communication device comprises a smartphone.

19. The system of claim 18 wherein said second communication device comprises a Vehicle Control Unit (VCU).

20. The system of claim 11 wherein:
- said vehicle has a schedule with a specified scheduled arrival time at each of a plurality of specified destinations;
- at least one said first communication device and said second communication device determines said vehicle's estimated time of arrival at a next one of said specified destinations; and
- wherein at least one said first communication device and said second communication device notify each of multiple priority detectors between said first vehicle's current location and said next one of said specified destinations based upon said vehicle's estimated time of arrival at said next one of said specified destinations so that said vehicle arrives at said next one of said specified destinations closer to said specified scheduled arrival time for said next one of said specified destinations than if said modification did not occur.

\* \* \* \* \*

UNITED STATES PATENT AND TRADEMARK OFFICE
CERTIFICATE OF CORRECTION

| | | |
|---|---|---|
| PATENT NO. | : 12,167,440 B2 | Page 1 of 1 |
| APPLICATION NO. | : 18/233151 | |
| DATED | : December 10, 2024 | |
| INVENTOR(S) | : Brad Cross, Terry Fryar and Nicholas Freed | |

It is certified that error appears in the above-identified patent and that said Letters Patent is hereby corrected as shown below:

On the Title Page

The residence associated with inventor Terry Fryar should be corrected to:
(72) Inventors: Brad Cross, McLeansboro, IL (US);
Terry Fryar, Benton, IL (US);
Nicholas Freed, Thompsonville, IL (US)

Signed and Sealed this
Twenty-first Day of January, 2025

Coke Morgan Stewart
*Acting Director of the United States Patent and Trademark Office*